US012142870B2

(12) United States Patent
Kudo

(10) Patent No.: US 12,142,870 B2
(45) Date of Patent: Nov. 12, 2024

(54) CONNECTOR

(71) Applicant: SUMITOMO WIRING SYSTEMS, LTD., Mie (JP)

(72) Inventor: Yasuhiro Kudo, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 449 days.

(21) Appl. No.: 17/612,263

(22) PCT Filed: May 13, 2020

(86) PCT No.: PCT/JP2020/019095
§ 371 (c)(1),
(2) Date: Nov. 18, 2021

(87) PCT Pub. No.: WO2020/235416
PCT Pub. Date: Nov. 26, 2020

(65) Prior Publication Data
US 2022/0239030 A1 Jul. 28, 2022

(30) Foreign Application Priority Data
May 23, 2019 (JP) ................................ 2019-096505

(51) Int. Cl.
*H01R 13/405* (2006.01)
*H01R 13/659* (2011.01)

(52) U.S. Cl.
CPC ......... *H01R 13/405* (2013.01); *H01R 13/659* (2013.01)

(58) Field of Classification Search
CPC ...... H01R 13/40; H01R 13/405; H01R 13/41; H01R 13/658; H01R 13/6581; H01R 13/659
USPC .................................................... 439/607.01
See application file for complete search history.

(56) References Cited

U.S. PATENT DOCUMENTS

2009/0023345 A1 1/2009 Matsumoto et al.
2012/0094537 A1 4/2012 Aoki et al.
2019/0051997 A1 2/2019 Sakakura et al.

FOREIGN PATENT DOCUMENTS

JP 2016-213046 A 12/2016

OTHER PUBLICATIONS

International Search Report issued on Jul. 14, 2020 for WO 2020/235416 A1 (4 pages).

*Primary Examiner* — Khiem M Nguyen
(74) *Attorney, Agent, or Firm* — Venjuris, P.C.

(57) ABSTRACT

The present disclosure provides a connector capable of simplifying the configuration thereof and enhancing the versatility of terminals to be connected. One end of a busbar includes a first connecting portion to be connected to a device-side terminal, and the other end of the busbar includes a second connecting portion to be connected to a wire-side terminal. Each housing is molded using each busbar as an insert and held in close contact with a peripheral surface of each busbar. The respective first connecting portions and the respective second connecting portions are exposed outside the respective housings. The respective first connecting portions are located on a straight line A1 along an extending direction Y, and the respective second connecting portions are located on a straight line A2 along an orthogonal direction Z.

3 Claims, 8 Drawing Sheets

CONNECTOR

CROSS REFERENCE TO RELATED APPLICATIONS

This application is a national phase of PCT application No. PCT/JP2020/019095, filed on 13 May 2020, which claims priority from Japanese patent application No. 2019-096505, filed on 23 May 2019, all of which are incorporated herein by reference.

TECHNICAL FIELD

The present disclosure relates to a connector.

BACKGROUND

Conventionally, a connector is known which connects a plurality of I-shaped device-side terminals projecting from a device and a plurality of I-shaped wire-side terminals provided on the tips of a plurality of wires arranged in parallel (see, for example, Patent Document 1). A connector described in Patent Document 1 includes a device-side insertion hole into which two device-side terminals are inserted and a box-shaped housing having a wire-side insertion hole into which two wire-side terminals are inserted.

The device-side insertion hole is provided in a mounting surface on a side to be mounted on a device, out of side surfaces of the housing. The wire-side insertion hole is provided in the side surface orthogonal to the mounting surface, out of the side surfaces of the housing.

Each device-side terminal and each wire-side terminal are arranged in the housing with bolt insertion holes respectively formed in the tips of the respective terminals overlapping each other. The housing is formed with a work opening for bolting each device-side terminal and each wire-side terminal. This opening is closed and sealed by a service cover.

Here, lengths of the respective device-side terminals are different from each other. Further, lengths of the respective wire-side terminals are different from each other. The short device-side terminal and the short wire-side terminal are connected, and the long device-side terminal and the long wire-side terminal are connected, whereby the respective device-side terminals and the respective wire-side terminals are connected in an orthogonal state.

PRIOR ART DOCUMENT

Patent Document

Patent Document 1: JP 2016-213046

SUMMARY OF THE INVENTION

Problems to be Solved

In a structure for connecting the respective device-side terminals and the respective wire-side terminals using the connector described in Patent Document 1, the lengths of the respective device-side terminals and those of the respective wire-side terminals need to be changed to correspond to a connection mode in the case of changing the connection mode such as connection angles of the respective wire-side terminals to the respective device-side terminals for the convenience of layout. Further, the shape of a seal member or the like for sealing between the housing and the service cover also needs to be changed in addition to the shape of the housing including the service cover.

The present disclosure aims to provide a connector capable of simplifying the configuration thereof and enhancing the versatility of terminals to be connected.

Means to Solve the Problem

A first aspect of the present disclosure is directed to a connector with a plurality of busbars provided in parallel to each other; and a plurality of housings made of resin for individually covering around each busbar, wherein one end of each busbar includes a first connecting portion to be connected to a first terminal, the other end of each busbar includes a second connecting portion to be connected to a second terminal, the housing is molded using the busbar as an insert and held in close contact with a peripheral surface of the busbar, the first and second connecting portions are exposed outside the housing covering around the busbar including the first and second connecting portions, the respective first connecting portions are located on a straight line along an arrangement direction of the one ends of the busbars, and the respective second connecting portions are located on a straight line along an arrangement direction of the other ends of the busbars.

According to the first aspect, the respective first terminals are connected to the respective first connecting portions outside the respective housings. Further, the respective second terminals are connected to the respective second connecting portions outside the respective housings. Here, the respective first connecting portions are located on the straight line along the arrangement direction of the one ends of the busbars. Further, the respective second connecting portions are located on the straight line along the arrangement direction of the other ends of the busbars. Thus, in the case of changing a connection mode such as connection angles of the second terminals to the first terminals, the shapes of the first terminals and the second terminals to be connected to the connector need not be changed by preparing the connector including the plurality of busbars and the plurality of housings shaped to correspond to the connection mode.

According to the first aspect, the respective housings are molded using the respective busbars as inserts and held in close contact with the peripheral surfaces of the respective busbars. Thus, sealing is provided between the respective housings and the respective busbars by the respective housings themselves. In this way, a sealing member for sealing between the respective housings and the respective busbars is unnecessary.

According to the first aspect, since the busbars, i.e. the housings, are independent of each other, relative positions of the busbars can be finely adjusted when the connector is connected. Thus, variations of relative positions of the respective first terminals, relative positions of the respective second terminals and relative positions of the first and second terminals can be absorbed by finely adjusting the relative positions of the respective busbars.

A second aspect of the present disclosure is directed to a connector with a plurality of busbars provided in parallel to each other, and one housing made of resin for collectively covering around the plurality of busbars, wherein one end of each busbar includes a first connecting portion to be connected to a first terminal, the other end of each busbar includes a second connecting portion to be connected to a second terminal, the housing is molded using the busbars as inserts and held in close contact with peripheral surfaces of the respective busbars, the respective first connecting portions and the respective second connecting portions are exposed outside the housing, the respective first connecting portions are located on a straight line along an arrangement direction of the one ends of the busbars, and the respective second connecting portions are located on a straight line along an arrangement direction of the other ends of the busbars.

According to the second aspect, the respective first terminals are connected to the respective first connecting portions outside the housing. Further, the respective second terminals are connected to the respective second connecting portions outside the housing. Here, the respective first connecting portions are located on the straight line along the arrangement direction of the one ends of the busbars. Further, the respective second connecting portions are located on the straight line along the arrangement direction of the other ends of the busbars. Thus, in the case of changing a connection mode such as connection angles of the second terminals to the first terminals, the shapes of the plurality of first terminals and the plurality of second terminals to be connected to the connector need not be changed by preparing the connector including the plurality of busbars and the housing shaped to correspond to the connection mode.

According to the second aspect, the housing is molded using the respective busbars as inserts and held in close contact with the peripheral surfaces of the respective busbars. Thus, sealing is provided between the housing and the respective busbars by the housing itself. In this way, a sealing member for sealing between the housing and the respective busbars is unnecessary.

According to the second aspect, since the connector is configured by integrating the plurality of busbars by one housing, the number of components of the connector can be reduced.

Effect of the Invention

According to the connector of the present disclosure, a configuration can be simplified and the versatility of terminals to be connected can be enhanced.

DETAILED DESCRIPTION TO EXECUTE THE INVENTION

Hereinafter, one embodiment of a connector is described with reference to FIGS. 1 to 9. Note that the present invention is not limited to these illustrations and is intended to be represented by claims and include all changes in the scope of claims and in the meaning and scope of equivalents.

Figure 1:
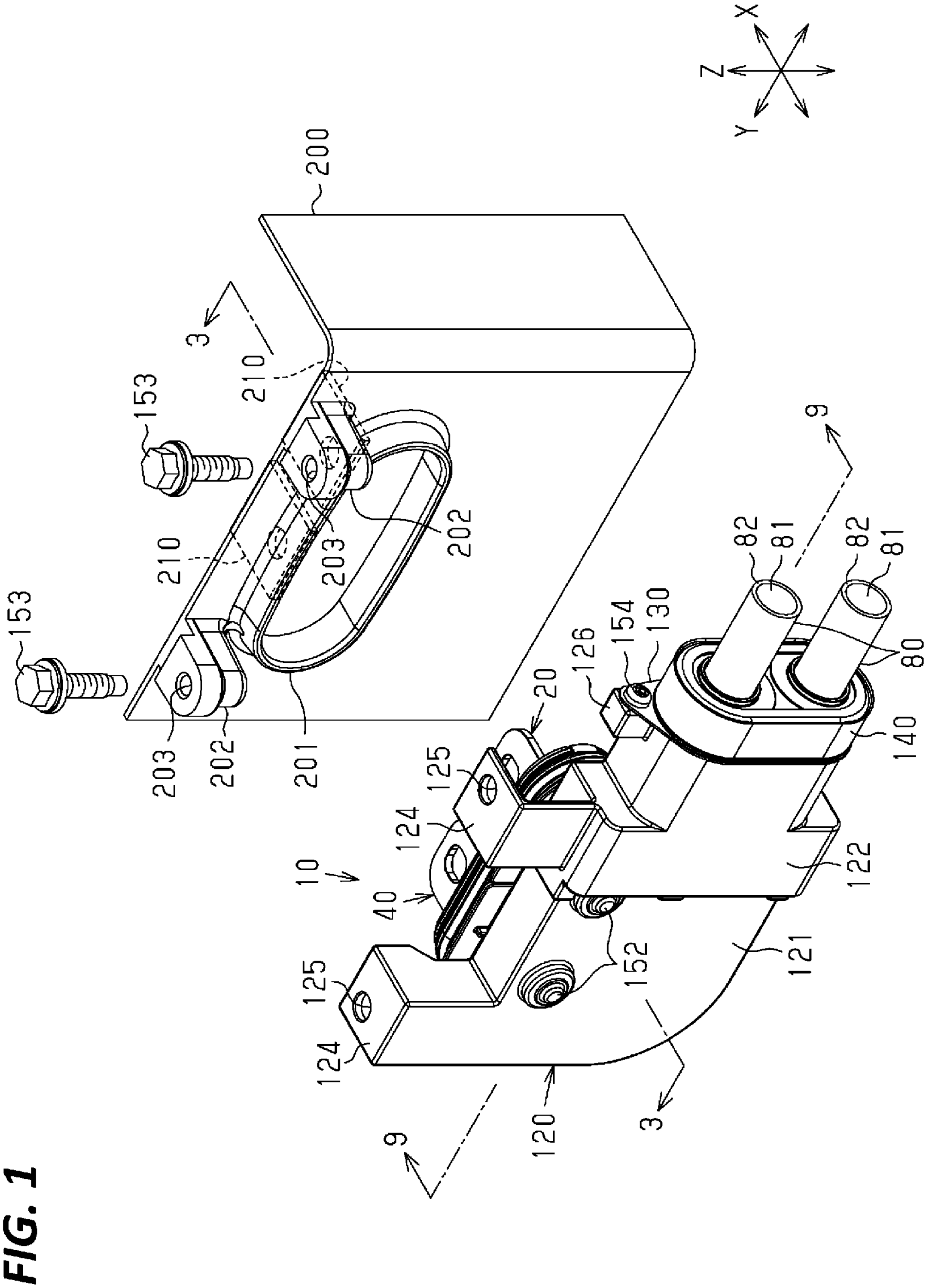
FIG. 1 is an exploded perspective view separately showing a connector connected to wires and a case of a device for the connector of one embodiment.
Figure 2:
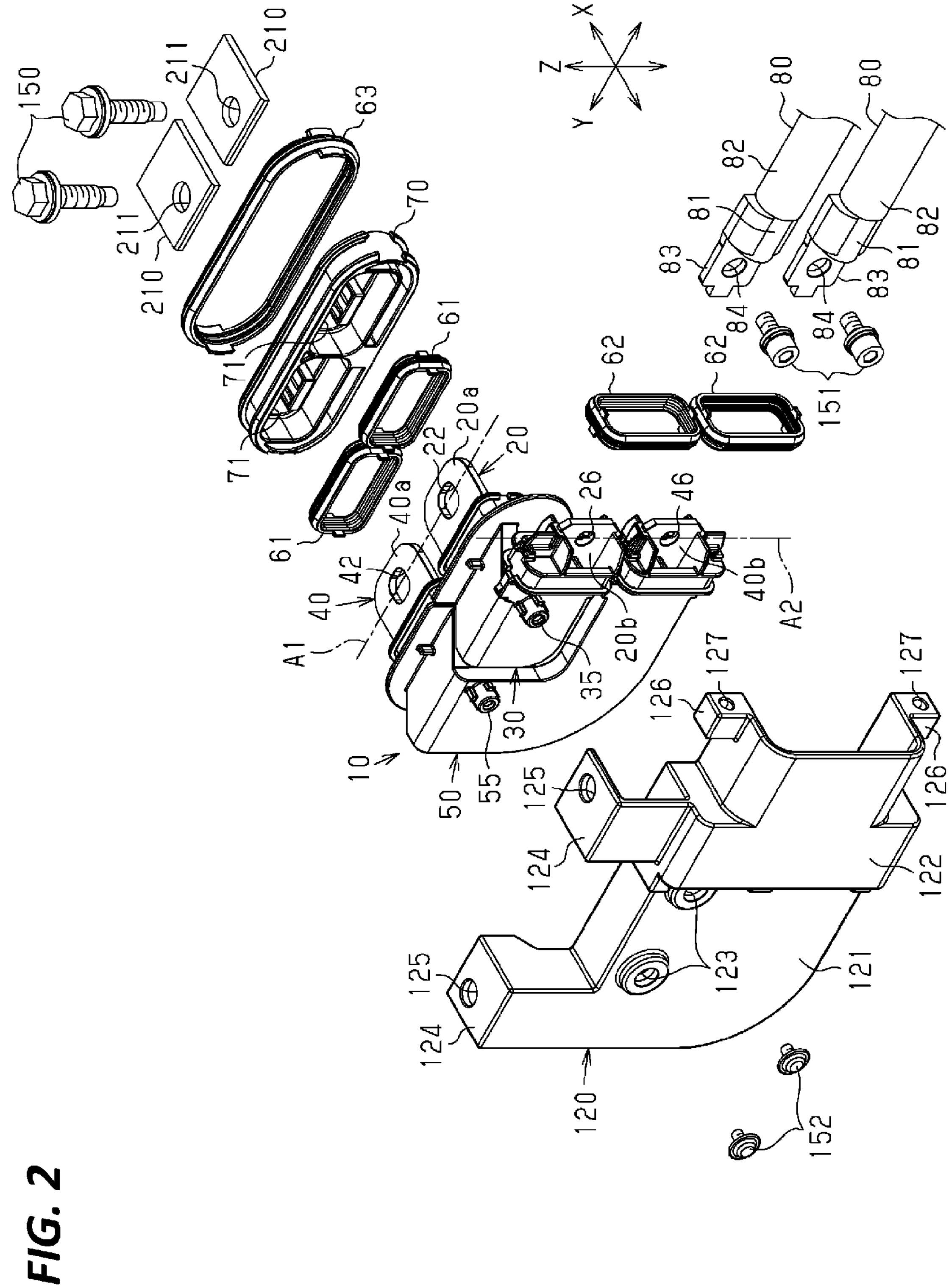
FIG. 2 is an exploded perspective view showing the connector and the wires of the embodiment.

As shown in FIGS. 1 and 2, a connector 10 of this embodiment is for connecting two device-side terminals 210 provided in a case 200 of a device and wire-side terminals 83 provided on the tips of two wires 80 extending in parallel to each other. Note that the device is, for example, a motor, an inverter or the like installed in a hybrid vehicle or electric vehicle.

As shown in FIG. 1, the case 200 includes a mounting portion 201 having an elliptical tube shape into which the connector 10 is to be mounted, and a pair of fixing portions 202 to which the connector 10 are fixed. Each fixing portion 202 is formed with a screw hole 203.

As shown in FIGS. 1 and 2, the respective device-side terminals 210 are provided in parallel to each other on a terminal block (not shown) arranged in the case 200. Each device-side terminal 210 is formed with an insertion hole 211. The device-side terminal 210 corresponds to an example of a first terminal.

Each wire 80 includes a conductive core 81 and an insulation coating 82 made of resin for covering the outer periphery of the core 81. The wire-side terminal 83 is crimped to the tip of the core 81 exposed from each insulation coating 82. The wire-side terminal 83 is formed with an insertion hole 84. The wire-side terminal 83 corresponds to an example of a second terminal.

In the following description, a direction in which the case 200 and the connector 10 are facing other is referred to as a facing direction X, an extending direction of each wire 80 is referred to as an extending direction Y and a direction orthogonal to both the facing direction X and the extending direction Y is referred to as an orthogonal direction Z. Further, a side in the facing direction X where the connector 10 is facing the mounting portion 201 is referred to as a front side, and a side opposite to the front side in the facing direction X is referred to as a rear side. Further, a side in the extending direction Y where the wire 80 is facing the connector 10, i.e. a tip side of the wire 80, is referred to as a tip side, and a side opposite to the tip side in the extending direction Y is referred to as a base end side.

As shown in FIG. 2, the connector 10 includes a first busbar 20 and a second busbar 40 provided in parallel to each other and a first housing 30 and a second housing 50 made of resin for individually covering around the first busbar 20 and the second busbar 40. Each busbar 20, 40 is, for example, formed by press-working a metal plate material such as copper, copper alloy, aluminum or aluminum alloy.

The connector 100 also includes a shield member 120, to which the first and second housings 30, 50 are fixed and which electromagnetically shields the first and second busbars 20, 40.

First, the first busbar 20 and the first housing 30 are described in detail.

<First Busbar 20>

Figure 3:
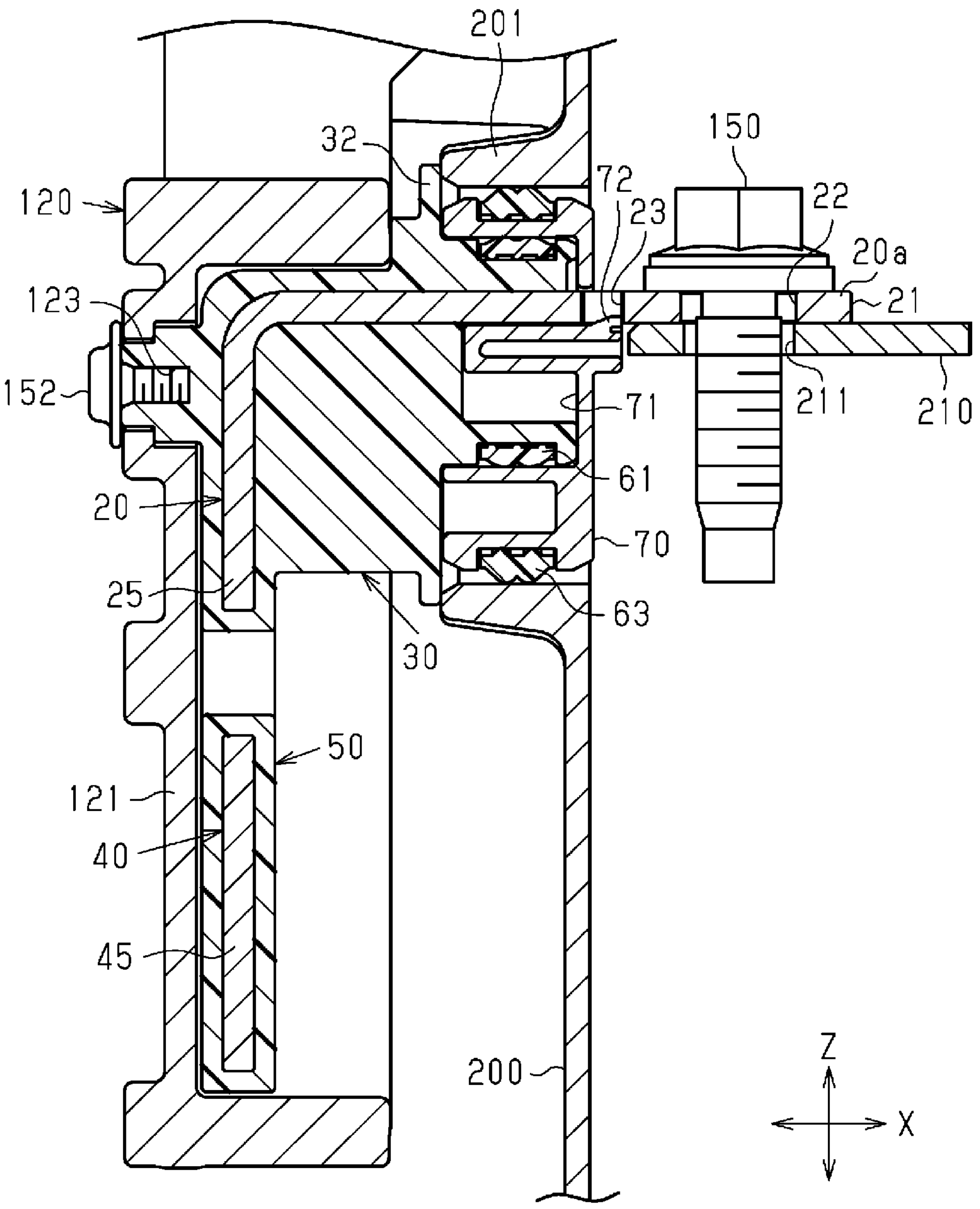
FIG. 3 is a section along 3-3 of FIG. 1.
Figure 4:
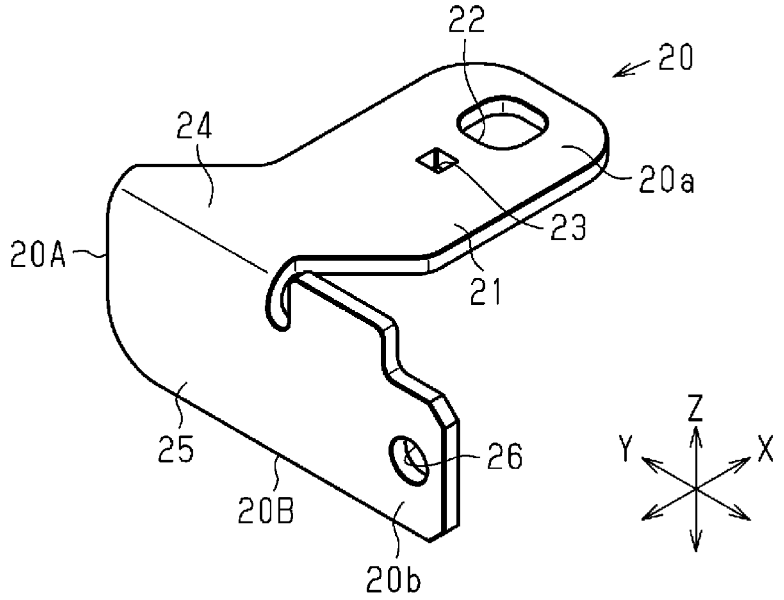
FIG. 4 is a perspective view showing a first busbar of the embodiment.

As shown in FIGS. 3 and 4, the first busbar 20 includes a device-side extending portion 21 extending along the facing direction X with a plate thickness direction matching the orthogonal direction Z, i.e. matching a plate thickness direction of the device-side terminal 210. The front end of the device-side extending portion 21, i.e. one end of the first busbar 20, includes a first connecting portion 20*a* to be connected to the device-side terminal 210. The first connecting portion 20*a* is formed with a first insertion hole 22 penetrating in the orthogonal direction Z.

As shown in FIG. 3, a bolt 150 is inserted into the first insertion hole 22 of the first connecting portion 20*a* and the insertion hole 211 of the device-side terminal 210. This bolt 150 is screwed into the aforementioned terminal block, whereby the first busbar 20 and the device-side terminal 210 are electrically connected.

As shown in FIG. 4, a locking portion 23 penetrating in the orthogonal direction Z is formed in a part of the device-side extending portion 21 behind the first insertion hole 22.

An inclined portion 24 inclined to be located closer to a tip side in the extending direction Y toward a rear side in the facing direction X is continuously formed behind the device-side extending portion 21.

Further, the first busbar 20 includes a wire-side extending portion 25 bent behind the inclined portion 24 and extending along the extending direction Y with a plate thickness direction matching the facing direction X, i.e. matching a plate thickness direction of the wire-side terminal 83. A base end of the wire-side extending portion 25 in the extending direction Y, i.e. the other end of the first busbar 20, includes a second connecting portion 20*b* to be connected to the wire-side terminal 83. The second connecting portion 20*b* is formed with a second insertion hole 26 penetrating in the facing direction X.

As shown in FIG. 2, a bolt 151 is inserted into the second insertion hole 26 of the second connecting portion 20*b* and the insertion hole 84 of the wire-side terminal 83. This bolt 151 is screwed into a nut (not shown) fixed to the front surface of the wire-side terminal 83, whereby the first busbar 20 and the wire-side terminal 83 are electrically connected.

<First Housing 30>

As shown in FIGS. 2 and 3, the first housing 30 is molded using the first busbar 20 as an insert and held in close contact with the outer peripheral surface of the first busbar 20. However, the first connecting portion 20*a*, in particular a front part including the locking hole 23 of the device-side extending portion 21, and the second connecting portion 20*b* are exposed outside the first housing 30. The first housing 30 is shaped substantially in conformity with the shape of the first busbar 20.

Figure 5:
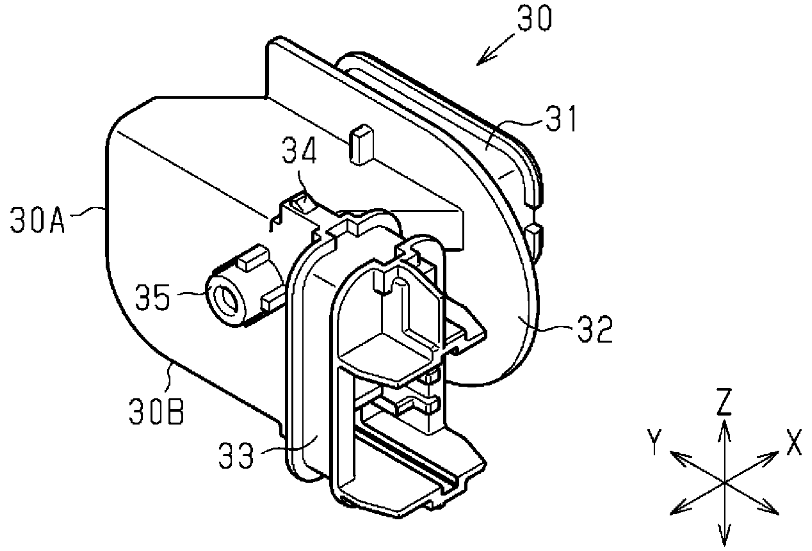
FIG. 5 is a perspective view showing a first housing of the embodiment.

As shown in FIGS. 2 and 5, a groove-like device-side groove portion 31 is provided over the entire periphery in the outer peripheral surface of a part of the first housing 30 where the first connecting portion 20*a* is exposed. A seal ring 61 is mounted in the device-side groove portion 31.

A flange 32 for coming into contact with the mounting portion 201 of the case 200 is formed behind the device-side groove portion 31.

A groove-like wire-side groove portion 33 is provided over the entire periphery in the outer peripheral surface of a part of the first housing 30 where the second connecting portion 20*b* is exposed. A seal ring 62 is mounted in the wire-side groove portion 33.

As shown in FIG. 5, locking claws 34 project on parts closer to the tip side in the extending direction Y than the wire-side groove portion 33 and on both sides in the orthogonal direction Z in the first housing 30.

A boss portion 35 for mounting the shield member 120 projects rearward on the outer surface of a rear side of the first housing 30. The boss portion 35 is formed with an internal thread.

Next, the second busbar 40 and the second housing 50 are described in detail.

The second busbar 40 and the second housing 50 are configured to correspond to the configurations of the first busbar 20 and the first housing 30. Components of the second busbar 40 corresponding to those of the first busbar 20 are denoted by reference signs "4*" obtained by adding "20" to the reference signs "2*" of the first busbar and repeated description is omitted. Further, components of the second housing 50 corresponding to those of the first housing 30 are denoted by reference signs "5*" obtained by adding "20" to the reference signs "3*" of the first housing and repeated description is omitted.

<Second Busbar 40>

Figure 6:
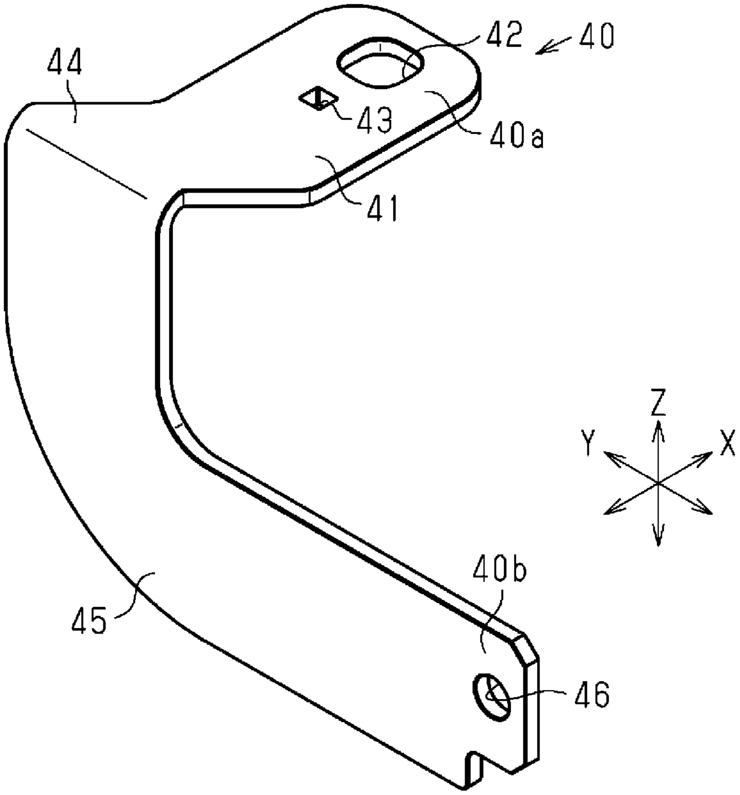
FIG. 6 is a perspective view showing a second busbar of the embodiment.

As shown in FIG. 6, a wire-side extending portion 45 of the second busbar 40 is bent behind an inclined portion 44, extends toward one side (lower side in FIG. 6) in the orthogonal direction Z and extends in a curved manner toward a base end side in the extending direction Y. The wire-side extending portion 45 extends in a curved manner with a plate thickness direction matching the facing direction X, i.e. matching a plate thickness direction of the wire-side terminal 83. Note that the wire-side extending portion 45 is curved along an edge part 20A on the tip side in the extending direction Y in the wire-side extending portion 25 of the first busbar 20 and along an edge part 20B on one side (lower side in FIG. 6) in the orthogonal direction Z in the wire-side extending portion 25. A base end in the extending direction Y of a part of the wire-side extending portion 45 extending along the extending direction Y, i.e. the other end of the second busbar 40, includes a second connecting portion 40*b*.

As shown in FIG. 2, the respective first connecting portions 20*a*, 40*a* of the first and second busbars 20, 40 are located on a straight line A1 along an arrangement direction of the one ends of the busbars 20, 40, i.e. the extending direction Y. More particularly, the first insertion holes 22, 42 are positioned or aligned on the common straight line A1. Further, the respective second connecting portions 20*b*, 40*b* of the first and second busbars 20, 40 are located on a straight line A2 along an arrangement direction of the other ends of the busbars 20, 40, i.e. the orthogonal direction Z. More particularly, the second insertion holes 26, 46 are positioned or aligned on the common straight line A2.

<Second Housing 50>

Figure 7:
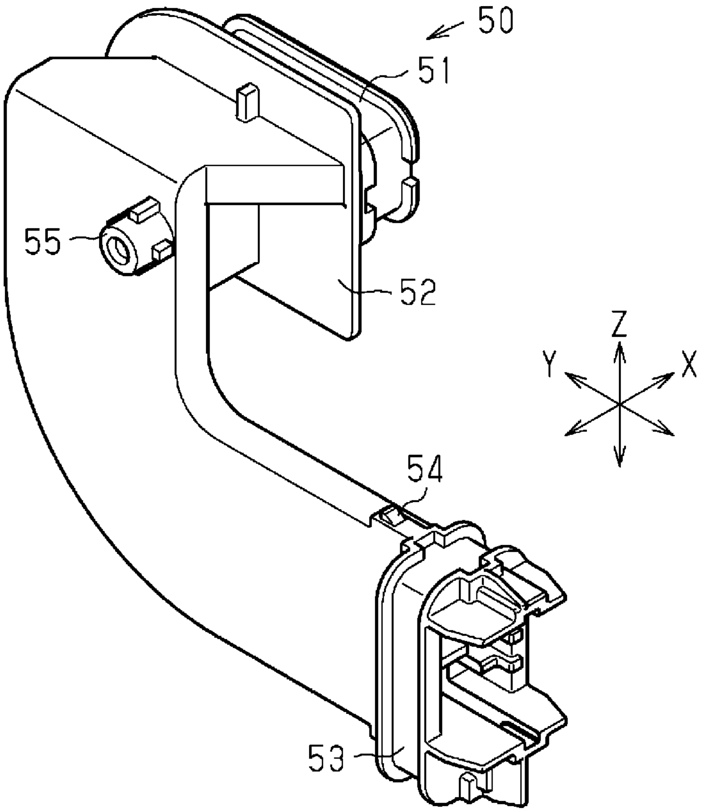
FIG. 7 is a perspective view showing a second housing of the embodiment.

As shown in FIGS. 2 and 7, the second housing 50 is curved along an edge part 30A on a tip side in the extending direction Y in the first housing 30 and an edge part 30B on one side (lower side in FIGS. 2 and 7) in the orthogonal direction Z in the first housing 30.

A boss portion 55 provided on the rear surface of the second housing 50 is located side by side with the boss portion 35 of the first housing 30 in the extending direction Y.

<Front Retainer 70>

As shown in FIGS. 2 and 3, the connector 10 includes a front retainer 70 made of resin and to be mounted on the respective housings 30, 50 from front.

The front retainer 70 includes a pair of inserting portions 71 which surround the respective device-side groove portions 31, 51 of the respective housings 30, 40 and into which the respective first connecting portions 20*a*, 40*a* are inserted.

A locking lance 72 cantilevered forward and resiliently deformable is provided in each inserting portion 71. Each locking lance 72 is locked into the locking hole 23, 43 of each busbar 20, 40.

By mounting the front retainer 70 on the respective housings 30, 50, the outer peripheral surfaces of the seal rings 61 in the respective device-side groove portions 31, 51 and the inner peripheral surfaces of the respective inserting portions 71 of the front retainer 70 are held in close contact.

In this way, sealing is provided between the respective housings 30, 50 and the front retainer 70.

A seal ring 63 is provided on the outer peripheral surface of the front retainer 70. By inserting the connector 10 into the mounting portion 201 of the case 200, the outer peripheral surface of the seal ring 63 and the inner peripheral surface of the mounting portion 201 are held in close contact. In this way, sealing is provided between the front retainer 70 and the mounting portion 201.

<Wire Housings 90>

Figure 8:
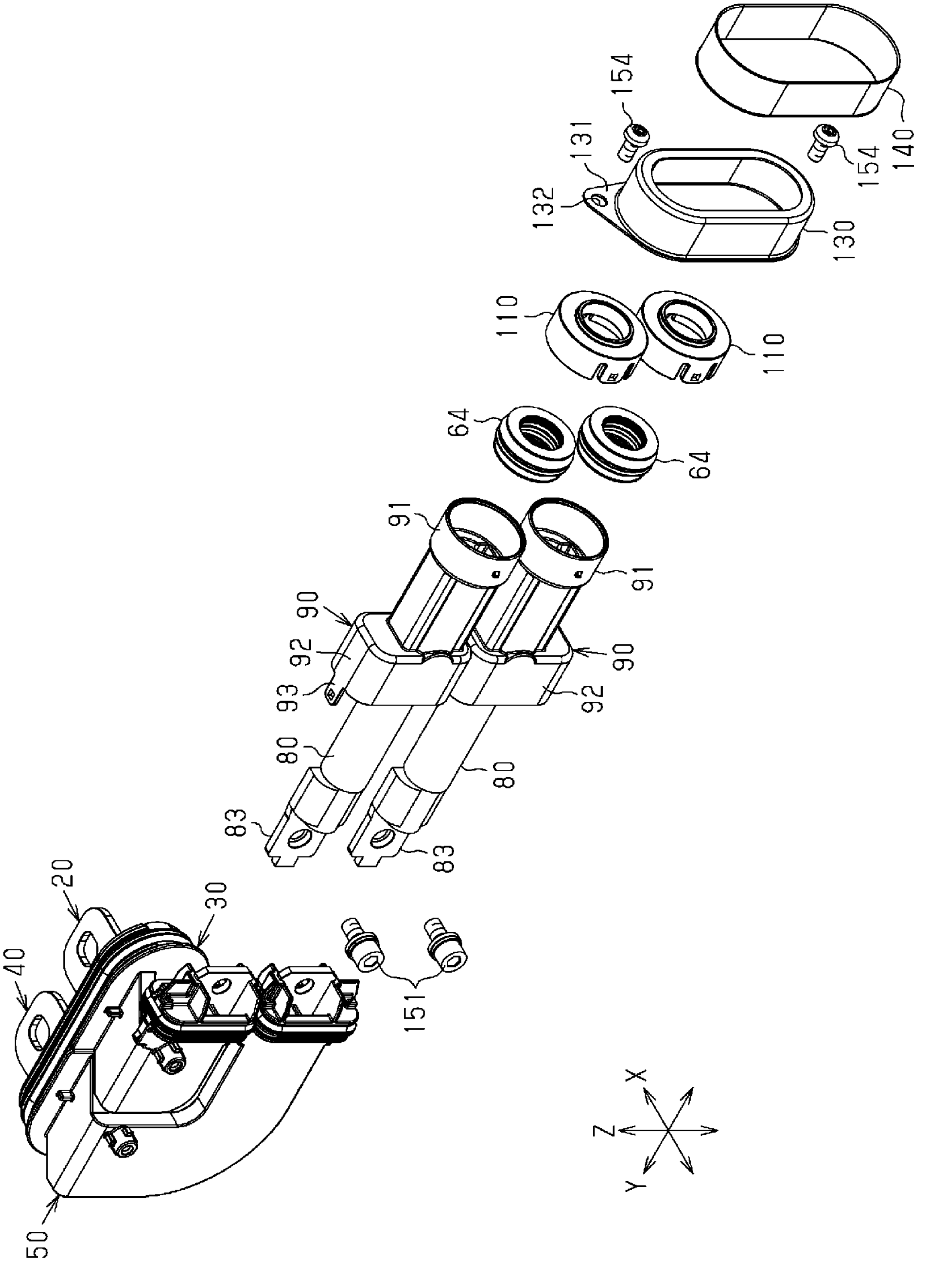
FIG. 8 is an exploded perspective view separately showing the connector of the embodiment and the wires.
Figure 9:
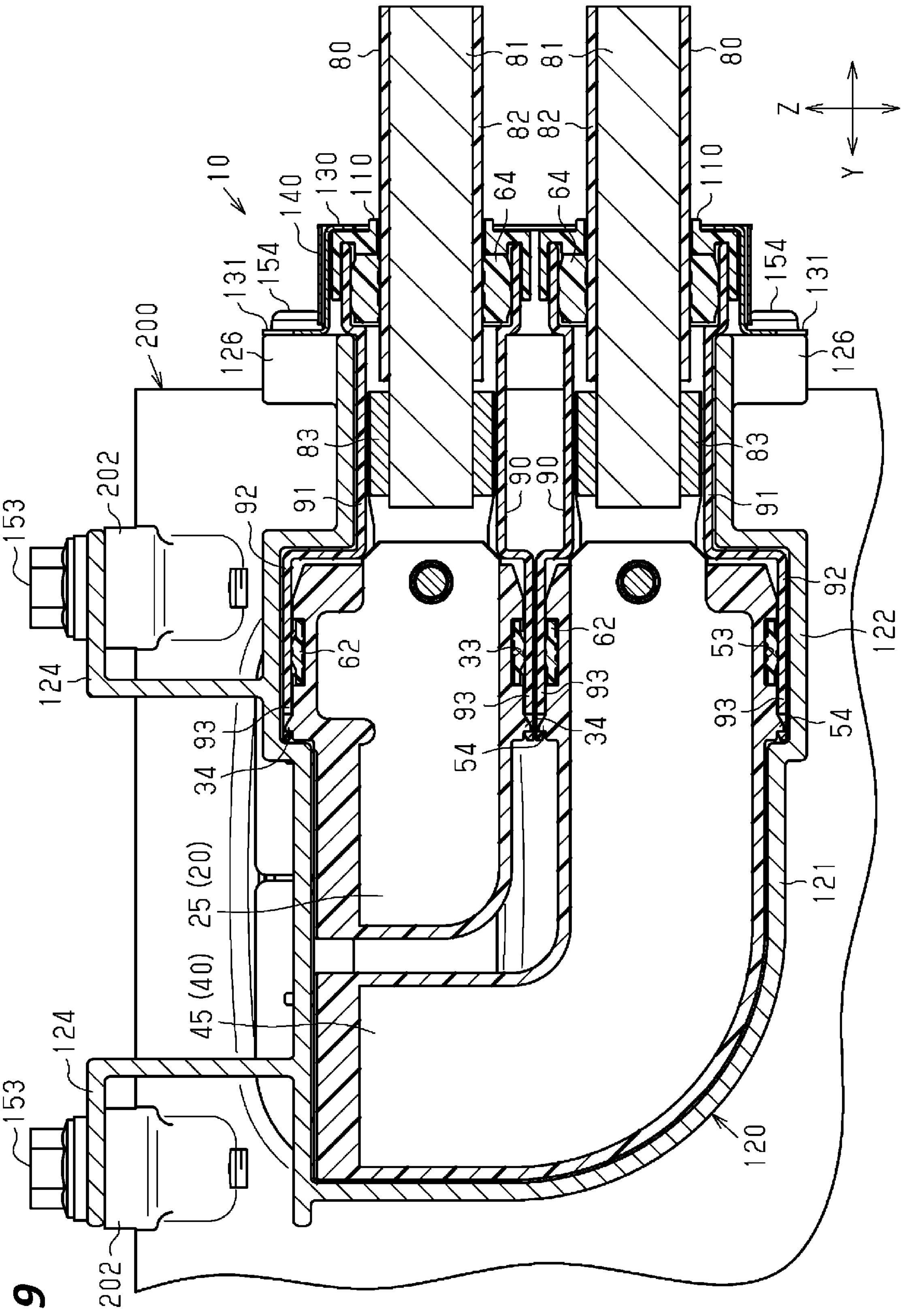
FIG. 9 is a section along 9-9 of FIG. 1.

As shown in FIGS. 8 and 9, the connector 10 includes wire housings 90 made of resin for individually covering the respective wires 80. Each wire housing 90 includes a tubular portion 91 for covering the wire 80 and a fitting portion 92 provided on a tip side of the tubular portion 91 for covering the wire-side groove portion 33, 53 of each housing 30, 50.

Locking portions 93 projecting toward a tip side of each fitting portion 92 are provided on both side parts in the orthogonal direction Z, out of an edge part of the tip side. Each locking portion 93 is locked to each locking claw 34, 54 of each housing 30, 50. In this way, each wire housing 90 is mounted on each housing 30, 50.

An annular seal plug 64 is inserted into a base end side part of each tubular portion 91. A back retainer 110 is mounted on this base end side part from an outer peripheral side. The seal plug 64 is retained by the back retainer 110.

<Shield Member 120>

As shown in FIGS. 1 and 2, the shield member 120 includes a tip side shell portion 121 for covering the respective housings 30, 50 and a base end side shell portion 122 for covering the pair of wire housings 90. A pair of through holes 123 are formed at positions of the tip side shell portion 121 corresponding to the respective boss portions 35, 55 of the respective housings 30, 50. By inserting screws 152 into the respective through holes 123 and screwing the screws 152 into the respective boss portions 35, 55, the first and second housings 30, 50 are fixed via the shield member 120. Note that the shield member 120 of this embodiment is formed by die casting using, for example, aluminum or aluminum alloy as a material.

The shield member 120 is provided with a pair of attaching portions 124 projecting toward one side (upper side in FIGS. 1 and 2) in the orthogonal direction Z. The respective attaching portions 124 project from the tip side shell portion 121 and the base end side shell portion 124. Each attaching portion 124 is formed with a through hole 125 penetrating in the orthogonal direction Z.

As shown in FIG. 1, bolts 153 are inserted into the through holes 125 of the respective attaching portions 124 and the screw holes 203 of the respective fixing portions 202 of the case 200. By screwing these bolts into the screw holes 203, the shield member 120 and the case 200 are fixed.

Fixing portions 126 project from both sides in the orthogonal direction Z in the base end side part of the base end side shell portion 122. Screw holes 127 are formed in the outer surfaces on base end sides of the respective fixing portions 126.

<Bracket 130>

As shown in FIGS. 1 and 8, a bracket 130 having an elliptical tube shape is provided on a base end side of the shield member 120. The bracket 130 is, for example, formed by press-working a steel plate or the like.

As shown in FIGS. 8 and 9, flanges 131 projecting outward are provided on both ends in the orthogonal direction Z of the bracket 130. Each flange 131 is formed with a through hole 132. By inserting screws 154 into the respective through holes 132 and screwing the screws 154 into the screw holes 127 of the fixing portions 126 of the shield member 120, the bracket 130 is fixed to the shield member 120.

Note that the outer peripheral surface of the bracket 130 is covered by an end of a braided wire (not shown) obtained by braiding conductive strands into a tubular shape.

<Crimp Ring 140>

As shown in FIGS. 1 and 8, a crimp ring 140 for fixing the braided wire to the bracket 130 is mounted on the outer peripheral surface of the bracket 130. The crimp ring 140 has an elliptical tube shape along the outer peripheral surface of the bracket 130. The crimp ring 140 is, for example, formed by press-working a steel plate or the like.

The braided wire is held on the bracket 130 and the bracket 130 and the braided wire are electrically connected by the crimp ring 140.

Functions of this embodiment are described.

The respective device-side terminals 210 are connected to the respective first connecting portions 20*a*, 40*a* outside the respective housings 30, 50. Further, the respective wire-side terminals 83 are connected to the respective second connecting portions 20*b*, 40*b* outside the respective housings 30, 50. Here, the respective first connecting portions 20*a*, 40*a* are located on the straight line A1 along the extending direction Y. Further, the respective second connecting portions 20*b*, 40*b* are located on the straight line A2 along the orthogonal direction Z. Thus, in the case of changing a connection mode such as connection angles of the wire-side terminals 83 to the device-side terminals 210, the shapes of the device-side terminals 210 and the wire-side terminals 83 to be connected to the connector 10 need not be changed by preparing the connector 10 including the respective busbars 20, 40 and the respective housings 30, 50 shaped to correspond to the connection mode (function 1).

Further, according to the configuration of this embodiment, the respective housings 30, 50 are molded using the respective busbars 20, 40 as inserts and held in close contact with the peripheral surfaces of the respective busbars 20, 40. Thus, sealing is provided between the respective housings 30, 50 and the respective busbars 20, 40 by the respective housings 30, 50 themselves. In this way, a seal member for sealing between the respective housings 30, 50 and the respective busbars 20, 40 is unnecessary (function 2).

Effects of this embodiment are described.

(1) The connector 10 includes the first and second busbars 20, 40 provided in parallel to each other, and the first and second housings 30, 50 made of resin for individually covering the respective busbars 20, 40. One end of each busbar 20, 40 includes the first connecting portion 20*a*, 20*b* to be connected to each device-side terminal 210, and the other end of each busbar 20, 40 includes the second connecting portion 20*b*, 40*b* to be connected to each wire-side terminal 83. The respective housings 30, 50 are molded using the respective busbars 20, 40 as inserts and held in close contact with the peripheral surfaces of the respective busbars 20, 40. The respective first connecting portions 20*a*, 20*b* and the respective second connecting portions 20*b*, 40*b* are exposed outside the respective housings 30, 50. The respective first connecting portions 20*a*, 40*a* are located on the straight line A1 along the extending direction Y, and the respective second connecting portions 20*b*, 40*b* are located on the straight line A2 along the orthogonal direction Z.

According to this configuration, since the functions 1 and 2 are achieved, the configuration of the connector 10 can be simplified and the versatility of the terminals to be connected can be enhanced.

Further, according to the above configuration, since the respective busbars 20, 40, i.e. the respective housings 30, 50 are independent of each other, relative positions of the respective busbars 20, 40 can be finely adjusted when the connector 10 is connected. Thus, variations of relative positions of the respective device-side terminals 210, relative positions of the respective wire-side terminals 83 and relative positions of the device-side terminals 210 and the wire-side terminals 83 can be absorbed by finely adjusting the relative positions of the respective busbars 20, 40.

(2) The connector 10 includes the shield member 120 to which the respective housings 30, 50 are fixed and which electromagnetically shields the respective busbars 20, 40.

According to this configuration, a state where the respective first connecting portions 20*a*, 40*a* are located on the straight line A1 and the respective second connecting portions 20*b*, 40*b* are located on the straight line A2 can be held by the shield member 120. Further, the respective busbars 20, 40 are electromagnetically shielded by the shield member 120. In this way, the number of components of the connector 10 can be reduced as compared to a configuration in which a fixing member for fixing the respective housings 30, 50 and the shield member 120 are separately provided.

This embodiment can be modified and carried out as follows. The above embodiment and the following modifications can be carried out in combination without technically contradicting each other. Note that, in the following modification shown in FIG. 10, components corresponding to those of the above embodiment are denoted by reference signs "3" obtained by adding "300" to the reference signs "" of the above embodiment and repeated description is omitted.

Figure 10:
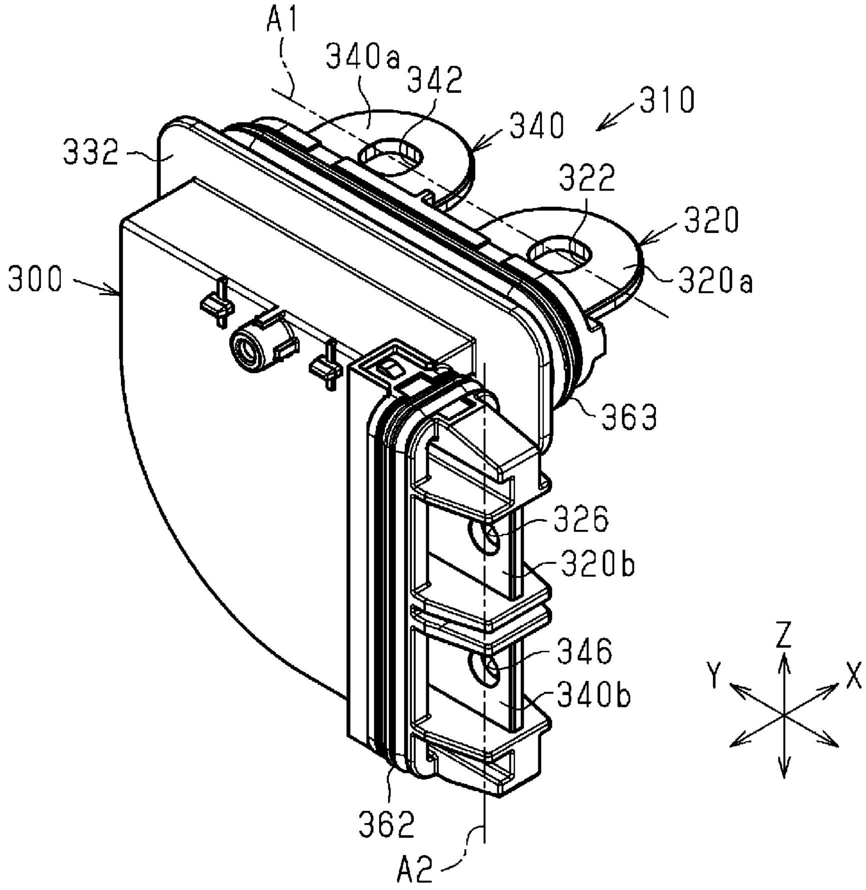
FIG. 10 is a perspective view showing a connector of a modification.

As shown in FIG. 10, it is also possible to adopt a connector 310 including a first busbar 320 and a second busbar 340 and one housing 300 made of resin for collectively covering around the busbars 320, 340. In this configuration, the housing 300 is molded using the respective busbars 320, 340 as inserts and held in close contact with the peripheral surfaces of the respective busbars 320, 340. First connecting portions 320*a*, 340*a* and second connecting portions 320*b*, 340*b* are respectively exposed outside the housing 300. The respective first connecting portions 320*a*, 340*a* are located on a straight line A1 and the respective second connecting portions 320*b*, 340*b* are located on a straight line A2.

According to this configuration, since the functions 1 and 2 are achieved, the configuration of the connector 310 can be simplified and the versatility of the terminals to be connected can be enhanced.

Further, since the connector 310 is configured by integrating the respective busbars 320, 340 by one housing 300 according to the above configuration, the number of components of the connector 310 can be reduced.

It is also possible to adopt a first busbar and a second busbar arranged such that center axes of first insertion holes 22, 42 coincide. In this configuration, the center axes of the first insertion holes 22, 42 coincide with an arrangement direction of one ends of the first and second busbars. In this case, the first and second busbars and the both device-side terminals 210 may be collectively connected by one bolt. Similarly, it is also possible to adopt a first busbar and a second busbar arranged such that center axes of second insertion holes 26, 46 coincide. In this configuration, the center axes of the second insertion holes 26, 46 coincide with an arrangement direction of the other ends of the first and second busbars. In this case, the first and second busbar and the both wire-side terminals 83 may be collectively connected by one bolt.

In the embodiment, the front edge parts of the device-side extending portions 21, 41 are located on the straight line A1. However, at least the first connecting portions 20*a*, 40*a* may be located on the straight line A1. In this case, the front edge parts of the device-side extending portions 21, 41 may not be located side by side along the straight line A1. Similarly, in the embodiment, the edge parts on the base end sides in the extending direction Y of the wire-side extending portions 25, 45 are located on the straight line A2. However, at least the second connecting portions 20*b*, 40*b* may be located on the straight line A2. In this case, the edge parts on the base end sides in the extending direction Y of the wire-side extending portions 25, 45 may not be located side by side along the straight line A2.

Each busbar 20, 40 may be an I-shaped busbar having the inclined portion omitted therefrom and including a device-side extending portion and a wire-side extending portion arranged along the same direction or may be an L-shaped busbar having the inclined portion omitted therefrom and including a device-side extending portion and a wire-side extending portion located on the same plane and orthogonal to each other.

The connector 10 may include three or more busbars and three or more housings made of resin for individually covering around these busbars. Further, the connector 310 in the aforementioned modification may include three or more busbars and a housing made of resin for collectively covering around these busbars.

Although an example of the connector 100 having the facing direction X, the extending direction Y and the orthogonal direction Z orthogonal to each other has been described in the embodiment, "orthogonal" means not only strictly orthogonal, but also substantially orthogonal within a range in which functions and effects in the embodiment are achieved. Further, "parallel" means not only strictly parallel, but also substantially parallel within a range in which functions and effects in the embodiment are achieved.

A curved or bent part between the inclined portion 24, 44 and the wire-side extending portion 25, 45 of the busbar 20, 40 of the embodiment is an example of an intermediate bent portion of the busbar.

The present disclosure includes the following implementation examples. Reference signs of several constituent elements of illustrative embodiments are given not for limitation, but for understanding assistance. Matters described in the following implementation examples may be partly omitted or several of the matters described in the implementation examples may be selected or extracted and combined.

[Addendum 1] A connector (20) according to several implementation examples of the present disclosure may be configured to electrically connect a plurality of first outer conductors (210) and a plurality of second outer conductors (80), wherein:

the connector (20) may include:

a plurality of conductive non-linear busbars (20, 40; 320, 340), each non-linear busbar (20, 40; 320, 340) being a conductor having a first connecting portion (20*a*, 40*a*: 320*a*, 340*a*) to be mechanically and electrically connected to one of the plurality of first outer conductors (210), a second connecting portion (20*b*, 40*b*: 320*b*, 340*b*) to be mechanically and electrically connected to one of the plurality of second outer conductors (80), and one or more intermediate bent portions between the first connecting portion (20_a_, 40_a_: 320_a_, 340_a_) and the second connecting portion (20_b_, 40_b_: 320_b_, 340_b_); and one or more electrically insulating housings (30, 50; 300) for holding and protecting at least the intermediate bent portions of the plurality of non-linear busbars (20, 40; 320, 340), the first connecting portions (20_a_, 40_a_: 320_a_, 340_a_) of the plurality of non-linear busbars (20, 40; 320, 340) may project from the electrically insulating housing(s) (30, 50; 300) and be arranged side by side on a first virtual plane (XY plane), the second connecting portions (20_b_, 40_b_: 320_b_, 340_b_) of the plurality of non-linear busbars (20, 40; 320, 340) may project from the electrically insulating housing(s) (30, 50; 300) and be arranged side by side on a second virtual plane (YZ plane) intersecting or orthogonal to the first virtual plane (XY plane), and the one or more electrically insulating housings (30, 50; 300) may be synthetic resin molding(s) integrated with the plurality of non-linear busbars (20, 40; 320, 340) to cover the intermediate bent portions.

[Addendum 2] In several implementation examples, the intermediate bent portions may be embedded in a synthetic resin forming the electrically insulating housing(s) (30, 50; 300).

[Addendum 3] In several implementation examples, the electrically insulating housing(s) (30, 50; 300) may be integrated undetachably from the plurality of non-linear busbars (20, 40; 320, 340).

[Addendum 4] In several implementation examples, each intermediate bent portion may have an outer peripheral surface including a bent inner side surface and a bent outer side surface and the one or more electrically insulating housings (30, 50; 300) may cover the entire outer peripheral surface of each intermediate bent portion including the bent inner side surface and the bent outer side surface.

[Addendum 5] In several implementation examples, the one or more electrically insulating housings (30, 50; 300) may be held in close contact with outer peripheral surfaces of the plurality of non-linear busbars (20, 40; 320, 340) in a liquid-tight manner.

[Addendum 6] In several implementation examples, the first connecting portions (20_a_, 40_a_: 320_a_, 340_a_) of the plurality of non-linear busbars (20, 40; 320, 340) may project in a first direction (X) from the one or more electrically insulating housings (30, 50; 300), and the second connecting portions (20_b_, 40_b_: 320_b_, 340_b_) of the plurality of non-linear busbars (20, 40; 320, 340) may project in a second direction (Y) different from the first direction (X) from the one or more electrically insulating housings (30, 50; 300).

[Addendum 7] In several implementation examples, the second direction (Y) may be intersecting or orthogonal to the first direction (X).

[Addendum 8] In several implementation examples, the first connecting portions (20_a_, 40_a_: 320_a_, 340_a_) of the plurality of non-linear busbars (20, 40; 320, 340) may be first connection ends aligned at a first position on the first virtual plane (XY plane) and in the first direction (X), and the second connecting portions (20_b_, 40_b_: 320_b_, 340_b_) of the plurality of non-linear busbars (20, 40; 320, 340) may be second connection ends aligned at a second position on the second virtual plane (YZ plane) and in the second direction (Y).

[Addendum 9] In several implementation examples, the first connecting portion (20_a_, 40_a_: 320_a_, 340_a_) may include a first insertion hole (22, 42; 322, 342) for fastening the first connecting portion and the first outer conductor (210) by bolting, the first insertion hole penetrating through the first connecting portion in a direction orthogonal to the first virtual plane (XY plane), and the second connecting portion (20_b_, 40_b_: 320_b_, 340_b_) may include a second insertion hole (26, 46; 326, 346) for fastening the second connecting portion and the second outer conductor (80) by bolting, the second insertion hole penetrating through the second connecting portion in a direction orthogonal to the second virtual plane (YZ plane).

[Addendum 10] In several implementation examples, the first connecting portion (20_a_, 40_a_: 320_a_, 340_a_) and/or the second connecting portion (20_b_, 40_b_: 320_b_, 340_b_) of each non-linear busbar (20, 40; 320, 340) may be connection end(s) in the form of flat plate(s).

[Addendum 11] In several implementation examples, the one or more electrically insulating housings (30, 50; 300) may be a plurality of synthetic resin moldings (30, 50) respectively integrated with the plurality of non-linear busbars (20, 40; 320, 340) to individually cover the plurality of non-linear busbars (20, 40; 320, 340).

[Addendum 12] In several implementation examples, the plurality of non-linear busbars (20, 40; 320, 340) may have mutually different busbar extension lengths.

[Addendum 13] In several implementation examples, the plurality of non-linear busbars (20, 40; 320, 340) may include a first non-linear busbar (20) and a second non-linear busbar (40), the first non-linear busbar (20) may have a first busbar extension length, the second non-linear busbar (40) have a second busbar extension length, and the second busbar extension length may be different from the first busbar extension length.

[Addendum 14] In several implementation examples, the one or more electrically insulating housings (30, 50; 300) may include a first electrically insulating housing (30) integrated with the first non-linear busbar (20) to cover the first non-linear busbar (20) and a second electrically insulating housing (50) integrated with the second non-linear busbar (40) to cover the second non-linear busbar (40), the first electrically insulating housing (30) may have a first housing extension length in an extending direction of the first non-linear busbar (20), the second electrically insulating housing (50) may have a second housing extension length in an extending direction of the second non-linear busbar (40), and the second housing extension length may be different from the first housing extension length.

[Addendum 15] In several implementation examples, the one or more electrically insulating housings (30, 50; 300) may be a single synthetic resin molding (300) for collectively covering the plurality of non-linear busbars (320, 340).

[Addendum 16] In several implementation examples, the first outer conductor (210) may be a device-side terminal accommodated and positioned inside a vehicle electrical device case (200) and the second outer conductor (80) may be a wire (80) of a vehicle wiring harness.

LIST OF REFERENCE NUMERALS

A1 . . . straight line
A2 . . . straight line
X . . . facing direction
Y . . . extending direction
Z . . . orthogonal direction
10 . . . connector

20 . . . first busbar
20A . . . edge part
20B . . . edge part
20*a* . . . first connecting portion
20*b* . . . second connecting portion
21 . . . device-side extending portion
22 . . . first insertion hole
23 . . . locking hole
24 . . . inclined portion
25 . . . wire-side extending portion
26 . . . second insertion hole
30 . . . first housing
30A . . . edge part
30B . . . edge part
31 . . . device-side groove portion
32 . . . flange
33 . . . wire-side groove portion
34 . . . locking claw
35 . . . boss portion
40 . . . second busbar
40*a* . . . first connecting portion
40*b* . . . second connecting portion
41 . . . device-side extending portion
42 . . . first insertion hole
43 . . . locking hole
44 . . . inclined portion
45 . . . wire-side extending portion
46 . . . second insertion hole
50 . . . second housing
51 . . . device-side groove portion
52 . . . flange
53 . . . wire-side groove portion
54 . . . locking claw
55 . . . boss portion
61 . . . seal ring
62 . . . seal ring
63 . . . seal ring
64 . . . seal plug
70 . . . front retainer
71 . . . inserting portion
72 . . . locking lance
80 . . . wire
81 . . . core
82 . . . insulation coating
83 . . . wire-side terminal
84 . . . insertion hole
90 . . . wire housing
91 . . . tubular portion
92 . . . fitting portion
93 . . . locking portion
110 . . . back retainer
120 . . . shield member
121 . . . tip side shell portion
122 . . . base end side shell portion
123 . . . through hole
124 . . . attaching portion
125 . . . through hole
126 . . . fixing portion
127 . . . screw hole
130 . . . bracket
131 . . . flange
132 . . . through hole
140 . . . crimp ring
150 . . . bolt
151 . . . bolt
152 . . . screw
153 . . . bolt
154 . . . screw
200 . . . case
201 . . . mounting portion
202 . . . fixing portion
203 . . . screw hole
210 . . . device-side terminal
211 . . . insertion hole
300 . . . housing
310 . . . connector
320 . . . first busbar
320*a* . . . first connecting portion
320*b* . . . second connecting portion
322 . . . first insertion hole
326 . . . second insertion hole
332 . . . flange
340 . . . second busbar
340*a* . . . first connecting portion
340*b* . . . second connecting portion
342 . . . first insertion hole
346 . . . second insertion hole
362 . . . seal ring
363 . . . seal ring

What is claimed is:

1. A connector, comprising:
a plurality of busbars provided in parallel to each other; and
a plurality of housings made of resin for individually covering around each busbar,
wherein:
one end of each busbar includes a first connecting portion to be connected to a first terminal,
the other end of each busbar includes a second connecting portion to be connected to a second terminal,
the housing is molded using the busbar as an insert and held in close contact with a peripheral surface of the busbar,
the first and second connecting portions are exposed outside the housing covering around the busbar including the first and second connecting portions,
the respective first connecting portions are located on a straight line (A1) along an arrangement direction (Y) of the one ends of the busbars,
the respective second connecting portions are located on a straight line (A2) along an arrangement direction (Z) of the other ends of the busbars, and
the straight line (A1) and the straight line (A2) are perpendicular to each other.

2. The connector of claim 1, further comprising a shield member for electromagnetically shielding each busbar, each housing being fixed to the shield member.

3. A connector, comprising:
a plurality of busbars provided in parallel to each other; and
one housing made of resin for collectively covering around the plurality of busbars,
wherein:
one end of each busbar includes a first connecting portion to be connected to a first terminal,
the other end of each busbar includes a second connecting portion to be connected to a second terminal,
the housing is molded using the busbars as inserts and held in close contact with peripheral surfaces of the respective busbars,
the respective first connecting portions and the respective second connecting portions are exposed outside the housing, the respective first connecting portions are located on a straight line (A1) along an arrangement direction (Y) of the one ends of the busbars, the respective second connecting portions are located on a straight line (A2) along an arrangement direction (Z) of the other ends of the busbars, and the straight line (A1) and the straight line (A2) are perpendicular to each other.

* * * * *